UNITED STATES PATENT OFFICE.

HERBERT H. DOW AND CHARLES J. STROSACKER, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING CARBON DISULFID.

1,350,858.   Specification of Letters Patent.   Patented Aug. 24, 1920.

No Drawing.   Application filed July 15, 1918. Serial No. 245,094.

*To all whom it may concern:*

Be it known that we, HERBERT H. Dow and CHARLES J. STROSACKER, citizens of the United States, and residents of Midland, county of Midland, and State of Michigan, have invented a new and useful Improvement in Methods of Making Carbon Disulfid, of which the following is a specification, the principle of the invention being herein explained and the best mode in which we have contemplated applying that principle, so as to distinguish it from other inventions.

As is well known, the old and generally used process for making carbon disulfid ($CS_2$) is to pass sulfur vapor over coke heated to a dull red heat, the two elements thereupon directly uniting, viz: $C+S_2=CS_2$. It has also been proposed to make such disulfid by heating pyrites ($FeS_2$) or other suitable sulfid with carbon at a red heat, as also to lead sulfur dioxid over red hot carbon. (See *Blucher's Modern Industrial Chemistry*, p. 139.) Neither of the last mentioned processes, however, have ever, so far as we are aware, gone into commercial use or even been successful in practice.

The object of the present invention is to provide a method for successfully using sulfur dioxid to react on the carbon, and to this end such invention then consists of the means hereinafter fully described and particularly pointed out in the claims, the following description setting forth in detail certain steps embodying the invention, such described steps constituting, however, but one of various ways in which the principle of the invention may be used.

It has been found that in order to continue the reaction between sulfur dioxid and carbon, it is necessary to supply additional heat because of the endothermic character of the reaction, and the difficulty of supplying such heat extraneously has militated against the success of the process. We have found, however, that where carbon in the proper form is used and such carbon the initially brought to a temperature (red hot in the case of coke) where the sulfur will combine therewith to form carbon disulfid, such temperature can be maintained by including a certain, relatively small, proportion of oxygen, i. e. air, with such dioxid.

In order that the dioxid may be pure, as also to permit the more readily proportioning of the air mixed therewith, such dioxid is desirably made by reacting on a sulfite salt such as calcium sulfite with a suitable acid. The gas thus resulting, admixed with the proper amount of air as aforesaid, is thereupon led into a suitable chamber or retort, preferably in the form of a tumbling barrel having a refractory lining, in which a body of coke has been previously placed and brought to a dull red heat. As already indicated, the sulfur dioxid will react with such coke to form the desired carbon disulfid, some carbon monoxid being also formed at the same time, in accordance with the following equations:—

$$3C+2SO_2=CS_2+2CO_2.$$
$$5C+2SO_2=CS_2+4CO.$$

The relative amount of carbon monoxid and dioxid formed will depend on the temperature at which the reaction is carried out. At the same time that the foregoing reactions occur, the oxygen in the air carried along with said sulfur dioxid unites with a portion of the coke, or in other words, causes such portion to burn, producing additional carbon dioxid, with the giving off of heat, this reaction being of course exothermic. As a result the coke is maintained at the temperature requisite for the reaction with the sulfur dioxid and such reaction will continue until the coke is substantially all used up.

The carbon disulfid vapor, together with the carbon dioxid that is formed, are continuously withdrawn from the retort, and their separation effected in any suitable way. Since, however, the disulfid, being mixed with gases, cannot be condensed by simply lowering the temperature, it is necessary to absorb it from such gases and then distil it from the absorbent. For the latter certain vegetable oils are preferable, although a heavy mineral oil may be used.

The use of our improved process is not limited to the particular source of sulfur dioxid described above, but such dioxid may be derived from any source and mixed with other gases or vapors so long as these are of a neutral character, due allowance being made in such case for the additional heat that may be absorbed thereby, thus making it necessary to supply an additional amount of oxygen with the sulfur dioxid. The advantage in utilizing the sulfur compound in gaseous form rather than the sulfur itself, which requires to be either liquefied or volatilized, should be at once apparent. At the same time the process is rendered substantially continuous, requiring to be interrupted only in order to charge the retort with a fresh quantity of coke.

Other modes of applying the principle of our invention may be employed instead of the one explained, change being made as regards the process herein disclosed, providing the step or steps stated by any one of the following claims or the equivalent of such step or steps be employed.

We therefore particularly point out and distinctly claim as our invention:—

1. The method of making carbon disulfid which consists in bringing sulfur dioxid in contact with heated coke, and admixing sufficient oxygen with such dioxid to maintain such coke at the requisite temperature.

2. The method of making carbon disulfid which consists in passing sulfur dioxid over coke at a red heat, and admixing sufficient air with such dioxid to maintain such coke at the requisite temperature.

3. The method of making carbon disulfid which consists in placing a charge of coke in a suitable rotary drum, bringing the same to a red heat, passing sulfur dioxid through such coke as such drum rotates, and admixing sufficient air with such dioxid to maintain such coke at the requisite temperature.

4. The method of making carbon disulfid which consists in placing a charge of coke in a suitable rotary drum, bringing the same to a red heat, passing sulfur dioxid through such coke as such drum rotates, admixing sufficient air with such dioxid to maintain such coke at the requisite temperature, and then absorbing the resulting carbon disulfid from the accompanying gases in a suitable liquid medium.

5. The method of making carbon disulfid which consists in placing a charge of coke in a suitable rotary drum, bringing the same to a red heat, passing sulfur dioxid through such coke as such drum rotates, admixing sufficient air with such dioxid to maintain such coke at the requisite temperature, and then absorbing the resulting carbon disulfid from the accompanying gases in a heavy oil.

6. The method of making carbon disulfid which consists in placing a charge of coke in a suitable rotary drum, bringing the same to a red heat, passing sulfur dioxid through such coke as such drum rotates, admixing sufficient air with such dioxid to maintain such coke at the requisite temperature, and then absorbing the resulting carbon disulfid from the accompanying gases in a heavy vegetable oil.

7. The method of making carbon disulfid which consists in reacting between sulfur dioxid and carbon, and simultaneously carrying on an exothermic reaction with such carbon, whereby the temperature requisite for such first reaction is maintained.

Signed by us, this 8th day of July, 1918.

HERBERT H. DOW.
CHARLES J. STROSACKER.